Sept. 13, 1966  H. F. VEIT ETAL  3,272,473
SPHERICAL VALVE HAVING ENCAPSULATED SEAL MEANS
Filed March 4, 1963  2 Sheets-Sheet 2

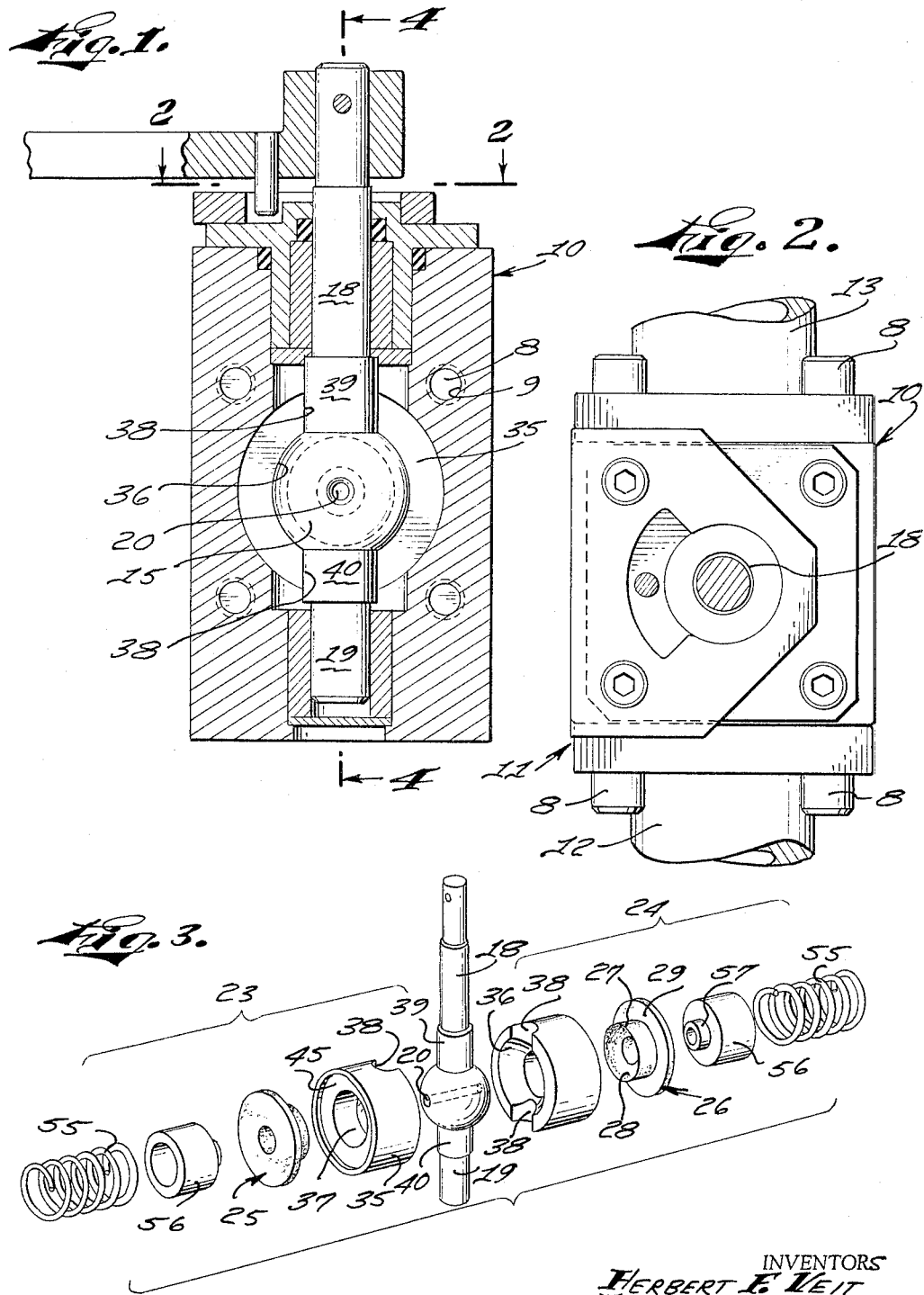

INVENTORS
HERBERT F. VEIT
WILLIAM R. DAY
BY
FOWLER & KNOBBE
ATTORNEYS

United States Patent Office 3,272,473
Patented Sept. 13, 1966

3,272,473
SPHERICAL VALVE HAVING ENCAPSULATED
SEAL MEANS
Herbert F. Veit and William R. Day, Fullerton, Calif.,
assignors to Robertshaw Controls Company, Richmond,
Va., a corporation of Delaware
Filed Mar. 4, 1963, Ser. No. 262,613
11 Claims. (Cl. 251—174)

The present invention relates to spherical valves and, more particularly, to such valves for statically and dynamically sealing gases and liquids with essentially zero leakage over a wide range of temperatures and differential pressures.

Contemporary pneumatic and hydraulic systems are sometimes required to operate under particularly severe temperature and pressure environments, e.g. temperature ranges of —430° F. to +500° F. and differential pressures of 0 p.s.i.a. to 10,000 p.s.i.a. A principal object of the present invention is to provide a ball valve of economical, compact construction which effectively seals gases and liquids over these temperature and pressure ranges.

Briefly, in accordance with a preferred form of the present invention, a ball valve assembly includes an integral sealing means formed from a resilient plastic material having first portions abutting the spherical valve plug and adapted for a limited linear displacement to compensate for wear, temperature changes, pressure variations and irregularities of ball movement; and second portions rigidly clamped to the valve casing for providing a zero leakage static seal. An important feature of the invention is that the sealing element is substantially encapsulated, thereby eliminating cold flow or extruding of the plastic sealing material. Such extrusion is undesirable since it results in permanent deformation of the seal.

A more thorough understanding of the invention may be obtained by a study of the following detailed description taken in connection with the accompanying drawings in which:

FIG. 1 is a front elevation view, partially in cross-section, of a spherical valve constructed in accordance with this invention;

FIG. 2 is a plan view of the valve assembly;

FIG. 3 is an exploded perspective view illustrating the shape and arrangement of the spherical valve plug and its associated seal assemblies;

Figure 4:
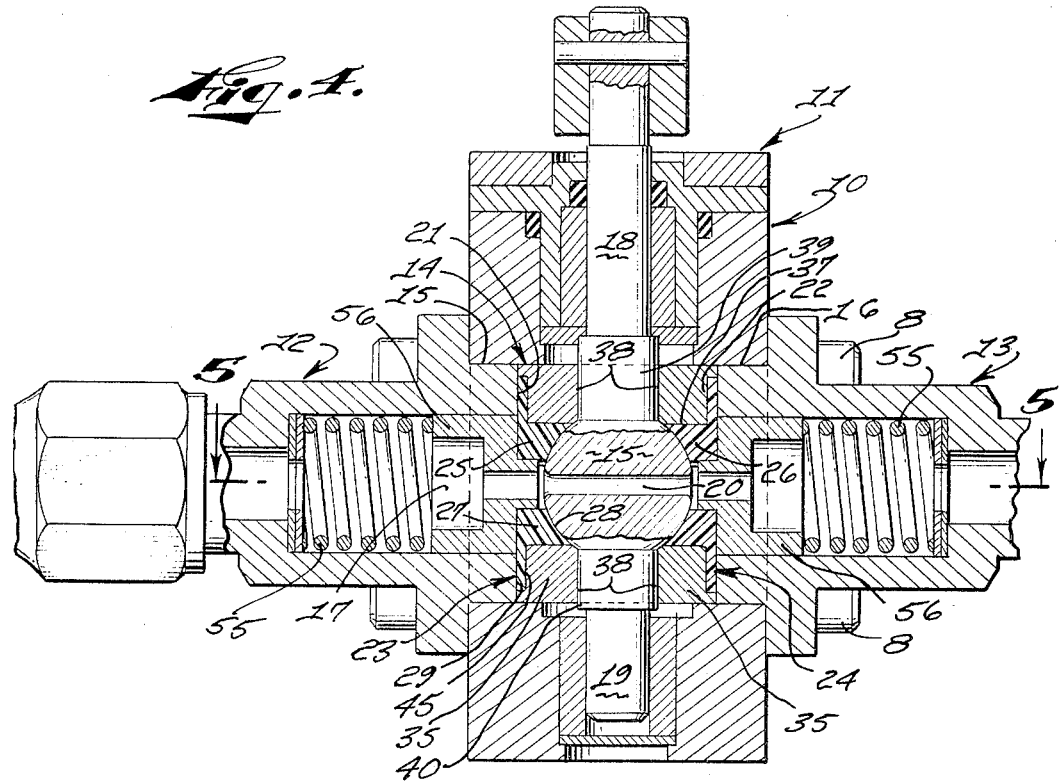
FIG. 4 is a cross-section view taken along line 4—4 of FIG. 1.

Referring now to the figures and particularly FIGS. 1 and 4, the ball valve of the invention comprises a casing 10 having a center section 11 and respective port sections 12, 13 joined together by bolts 8 passing through bores 9. Center casing section 11 includes a generally cylindrical chamber 14 in which a spherically shaped valve plug 15 is rotatably mounted. Chamber 14 is closed at its respective ends by the casing port sections 12, 13 each of which have an annular shoulder 15, 16 extending into the cylindrical chamber 14 to form a series of three cylindrical chambers separated by respective perpendicular annular casing walls 21, 22 (FIG. 4). As shown, these cylindrical chambers are in alignment to form a longitudinal flow passageway 17.

Valve plug 15 is provided at its upper and lower ends with respective journals 18, 19, each being fitted into a suitable bearing within the casing 11. This plug includes a bore 20 extending therethrough and adapted to be moved from a position wherein the bore is out of alignment with the fluid passageway 18 as shown by the phantom lines of FIG. 5 to a position wherein the bore is in alignment with the fluid passageway as shown by solid lines in FIG. 5, and, also, in the drawings of FIGS. 1 and 4.

A pair of sealing assemblies 23, 24 are placed in series with the valve plug 15, one sealing off pressure at the upstream side of the ball plug and the other sealing off pressure at the downstream side of the ball plug. Thus, in the shutoff position, it is virtually impossible for any leakage to occur from the upstream pressure to any cavity existing beyond the downstream seal, or for any reverse leakage if the downstream pressure is at a higher pressure level than the upstream pressure.

Referring now to the figures and particularly FIG. 3, each sealing assembly comprises an annular sealing element 25, preferably formed of a resilient plastic material having a low coefficient of friction, such as filled or unfilled molded polytetrafluorethylene or polychlorotrifluorethylene. These materials are given by way of example since the specific material used depends upon its compatability with the fluid or fluids handled by the valve, the temperatures of the fluid and ambient environment, and the torque desired to rotate the spherical valve plug 15.

Each sealing element 25 includes a first portion 27 having a face 28 provided with a hemispherical surface corresponding with the spherical surface of valve plug 15. This first portion is integral with a second portion 29 comprising a diametrically enlarged flange member.

Figure 5:
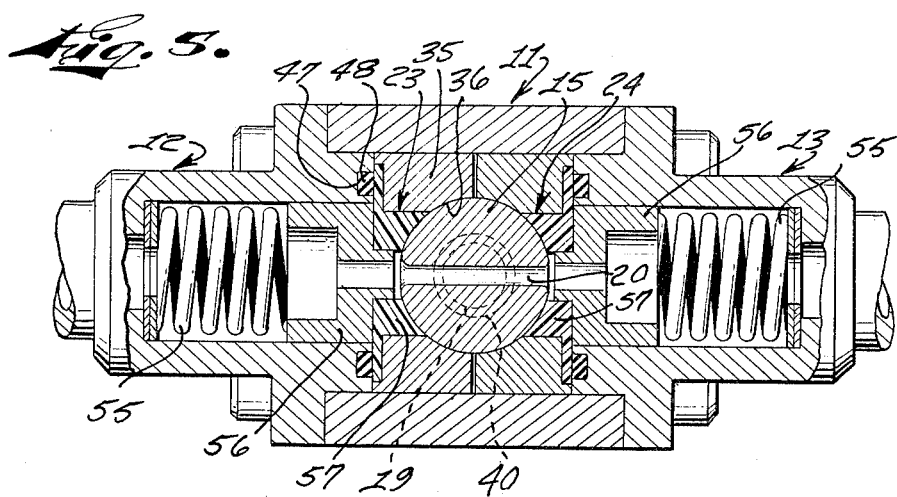
FIG. 5 is a cross-section view taken generally along line 5—5 of FIG. 4 and illustrating a modified embodiment of the invention.

Sealing assemblies 23, 24 further comprise a pair of juxtaposed half shell seal retainer members 35 which locate the annular sealing elements 25 relative to the casing 10 and valve plug 15. These sealing retainer members include a hemispherical surface 36 corresponding to the spherical surface of the valve plug and a bore 37 corresponding to the outer diameter of portion 27 of the sealing element 25. The half shells are further provided with diametrically disposed semicircular grooves 38 on their adjacent edges. These grooves jointly form cylindrical openings for receiving journaled portions 39, 40 of the valve plug 15. A shallow cylindrical chamber 45 is formed coaxial with the bore 27 in the face of the retainer opposite its spherical surface 36. The flange 29 of the sealing element 25 is retained within this chamber and clamped therein between the retainer 35 and a respective annular wall 21, 22. This casing wall may either comprise the annular planar structural configuration shown in FIG. 4 or, alternatively, include an annular groove 47 retaining an O-ring elastomer seal 48 as shown in FIG. 5. The latter configuration is particularly desirable when it is necessary to seal low molecular weight gases for very high differential pressures.

Each of the sealing assemblies further include means for constantly urging the respective sealing elements 25 against the valve plug 15, these means including a helical spring 55 mounted between the casing 10 and an annular seal loaded member 56 which in turn transfers the spring force against the sealing element 25. As shown, seal loader member 56 includes a cylindrical portion only slightly smaller than the cylindrical chamber of the port casing and a diametrically decreased portion 57 which extends into the aperture of the sealing element 25. The force exerted by the helical spring 55 insures a positive force upon the sealing element which is particularly advantageous for low differential pressures where there is a minimum pressure assist for effective sealing forces. At higher pressures, the sealing force is increased, thereby providing an effective fluid seal over a wide range of differential pressures.

The seal assembly configuration described hereinabove provides both a static and a dynamic seal. Thus, the portion 27 abutting the valve plug is capable of limited linear displacement to thus compensate for wear, temperature changes, pressure variations and irregularities of ball movement. The diametrically enlarged flange portion 29 provides a zero leakage static seal and prevents any external leakage from occurring due to this seal. It also prevents leakage from occuring along the outside diameter of the seal in both the flowing and shutoff portions of the ball valve.

A significant feature of the invention is that individual members of the sealing assembly and the annular casing members 21, 22 cooperate to substantially encapsulate the sealing elements 25. This is accomplished by totally confining a substantial portion of the seal in metal and maintaining minimum clearances for the remainder of the seal surface. This configuration substantially obviates any cold flow or extruding of the molded plastic material used for the sealing elements.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim:

1. In a valve assembly, the combination comprising a casing having a passageway formed therethrough;
a valve plug of spherical configuration having a bore extending therethrough rotatably mounted within said passageway and adapted to move from a position wherein the bore is out of alignment to a position wherein said bore is in alignment with said passageway;
seal retainer means comprising a pair of juxtaposed half shell members provided with a hemispherical surface corresponding to and closely fitting the spherical surface of said valve plug and having bores located coaxial with the flow passageway of said casing,
said seal retainer members further including a shallow cylindrical chamber formed in the face opposite said hemispherical surface;
sealing means retained by said seal retainer means comprising a pair of annular elements each having a first portion located within the bore of said seal retainer means and a diametrically enlarged integral second portion located within the shallow cylindrical chamber of the associated seal retainer means,
said first portion having a face provided with a hemispherical surface corresponding to and sealingly engaging the spherical surface of said valve plug;
means provided by said casing abutting the diametrically enlarged portion of said sealing means so as to rigidly clamp said portion between said casing and said seal retainer means; and
means for urging said sealing means against said valve plug.

2. In a valve assembly, the combination comprising a casing having a flow passageway formed therethrough;
a valve plug of spherical configuration having a bore extending therethrough rotatably mounted within said passageway and adapted to move from a position wherein the bore is out of aligment with said passageway to a position wherein said bore is in alignment with said passageway; and
a pair of sealing assemblies respectively located on the upstream and downstream sides of said valve plug, each said assembly comprising
a spring biased seal loader,
seal retainer means having an internal wall substantially abutting the valve plug and defining a bore aligned with said passageway, and
an annular sealing element having a face provided with a hemispherical surface corresponding to the spherical surface of said valve plug and a diametrically enlarged flange portion, said face of said sealing element being located through the bore of said seal retainer in juxtaposition with said valve plug and being constantly urged against said valve plug by said seal loader acting against the opposite surface of said annular sealing element to provide a zero leakage seal, said flange of said integral sealing element being clamped between said casing and said retainer means, said seal loader, said seal retainer, said casing, and said valve plug cooperating to substantially encapsulate said annular sealing element.

3. In a valve assembly, the combination comprising
a casing having a flow passageway formed therethrough;
a valve plug of spherical configuration having a bore extending therethrough rotatably mounted within said passageway and adapted to move from a position wherein the bore is out of alignment with said passageway to a position wherein said bore is in alignment with said passageway;
sealing means for preventing leakage of fluid to the outside of said bore and passageway when subjected to a very wide range of differential pressures having
a first portion abutting said valve plug adapted for a limited amount of flexure to compensate for wear, temperature changes, pressure variations, and irregularities of plug movement and
an integral second portion rigidly clamped to said casing to provide a zero leakage static seal;
means for substantially encapsulating said first portion of said sealing means; and
means including a portion of said encapsulating means for constantly urging the first portion of said sealing means against said valve plug to provide a zero leakage seal.

4. The valve assembly defined in claim 3 wherein:
said sealing means is formed of a resilient plastic material having a low coefficient of friction.

5. The valve assembly defined in claim 4 wherein:
said sealing means is formed of molded polytetrafluorethylene.

6. The valve assembly defined in claim 4 wherein:
said sealing means is formed of molded polychlorotrifluorethylene.

7. The valve assembly defined in claim 3 wherein:
said sealing means comprises a pair of annular elements each including a first portion having a face provided with a hemispherical surface corresponding to the spherical surface of said valve plug and a second portion comprising a diametrically enlarged flange portion fixedly retained by said casing.

8. In the valve assembly defined in claim 3:
an elastomeric O-ring seal retained in said casing in sealing relationship with the integral second portion of said sealing means.

9. The valve assembly defined in claim 3 wherein:
said encapsulating means includes a seal retainer having an interior wall substantially abutting the valve plug and defining a central bore through which the first portion of the sealing means extends; and
said means for constantly urging the first portion of said integral seal against said valve plug comprises a compression spring retained between said casing and said sealing means.

10. In a valve assembly, the combination comprising:
a casing having first and second cylindrical port chambers and a diametrically enlarged chamber located therebetween, said chambers being separated by substantially perpendicular annular casing walls;
a valve plug having a bore therethrough rotatably mounted within said diametrically cylindrical chamber;
a pair of assemblies respectively located on the upstream and downstream sides of said valve plug, each said assembly comprising
seal retainer means, an annular sealing element having a face provided with a hemispherical surface corresponding to the spherical surface of said valve plug and retained in juxtaposition therewith by said seal retainer means and a diametrically enlarged flange clamped between said seal retainer means and the associated perpendicular annular casing wall, and a spring biased seal loader mounted within each of said port chambers and urged against the side of said annular sealing element opposite said hemispherical face to provide a zero leakage seal, said perpendicular annular casing walls, said seal loader means, said seal retainer means and said valve plug cooperating to substantially encapsulate said integral sealing element.

11. In the valve assembly defined in claim 10:

an elastomeric O ring seal located in an annular groove in each of said perpendicular annular casing walls for providing an additional seal for said diametrically enlarged flange portion of said annular sealing element.

References Cited by the Examiner
UNITED STATES PATENTS

| | | | |
|---|---|---|---|
| 2,837,308 | 6/1958 | Shand | 251—174 |
| 2,885,179 | 5/1959 | Hartmann | 251—315 |
| 2,905,197 | 9/1959 | Janes | 251—174 X |
| 3,077,902 | 2/1963 | Vickery | 251—174 X |
| 3,118,650 | 1/1964 | Cooper | 251—172 |
| 3,124,334 | 3/1964 | Szohatzky | 251—315 X |
| 3,132,837 | 5/1964 | Britton | 251—174 X |

FOREIGN PATENTS

| | | |
|---|---|---|
| 1,263,041 | 4/1961 | France. |

WILLIAM F. O'DEA, *Primary Examiner.*

CLARENCE R. GORDON, ISADOR WEIL,
*Examiners.*